United States Patent
Zhang

(10) Patent No.: US 10,193,747 B2
(45) Date of Patent: Jan. 29, 2019

(54) FAULT DETECTION METHOD AND DEVICE

(71) Applicant: HUAWEI DEVICE CO., LTD., Dongguan (CN)

(72) Inventor: Xigang Zhang, Wuhan (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 67 days.

(21) Appl. No.: 15/301,274

(22) PCT Filed: Apr. 8, 2014

(86) PCT No.: PCT/CN2014/074892
§ 371 (c)(1),
(2) Date: Sep. 30, 2016

(87) PCT Pub. No.: WO2015/154217
PCT Pub. Date: Oct. 15, 2015

(65) Prior Publication Data
US 2017/0026229 A1    Jan. 26, 2017

(51) Int. Cl.
*H04N 7/173* (2011.01)
*H04L 12/24* (2006.01)
(Continued)

(52) U.S. Cl.
CPC ......... *H04L 41/0681* (2013.01); *H04B 10/07* (2013.01); *H04L 41/0645* (2013.01);
(Continued)

(58) Field of Classification Search
CPC combination set(s) only.
See application file for complete search history.

(56) References Cited

U.S. PATENT DOCUMENTS

2004/0111490 A1   6/2004   Im et al.
2007/0064622 A1*  3/2007   Bi ........................ H04M 1/24
                                                     370/254
(Continued)

FOREIGN PATENT DOCUMENTS

CN    101163054 A    4/2008
CN    101252472 A    8/2008
(Continued)

OTHER PUBLICATIONS

International Search Report dated Jan. 14, 2015 in PCT/CN2014/074892, filed Apr. 8, 2014.
(Continued)

*Primary Examiner* — Mulugeta Mengesha
(74) *Attorney, Agent, or Firm* — Oblon, McClelland, Maier & Neustadt, L.L.P.

(57) ABSTRACT

The present disclosure discloses a fault detection method and device. The method includes: receiving, by a terminal device, a fault detection instruction entered by a user, and determining a service type of a to-be-detected fault according to the fault detection instruction; determining fault detection content according to the service type; starting to detect the fault detection content to obtain a detection result; and presenting the detection result. In this way, whether in a period of deploying or in a period of using the terminal device, the fault detection instruction is directly triggered when there is a need to determine whether the terminal device is faulty, and then the fault detection content corresponding to the service type of the to-be-detected fault is detected, which effectively implements a self-detection capability of the terminal device, increases a fault locating speed, and improves fault detection accuracy.

18 Claims, 2 Drawing Sheets

(51) Int. Cl.
*H04B 10/07* (2013.01)
*H04L 12/26* (2006.01)

(52) U.S. Cl.
CPC ...... *H04L 41/0677* (2013.01); *H04L 41/0686* (2013.01); *H04L 43/50* (2013.01)

(56) References Cited

U.S. PATENT DOCUMENTS

| | | | |
|---|---|---|---|
| 2007/0162932 A1 | 7/2007 | Mickle et al. | |
| 2010/0054136 A1* | 3/2010 | Mehta | H04N 7/17318 370/245 |
| 2011/0072312 A1 | 3/2011 | Fan et al. | |
| 2012/0151549 A1* | 6/2012 | Kumar | H04N 17/004 725/131 |
| 2012/0303787 A1 | 11/2012 | Fan et al. | |

FOREIGN PATENT DOCUMENTS

| | | |
|---|---|---|
| CN | 102546476 A | 7/2012 |
| CN | 103209082 A | 7/2013 |

OTHER PUBLICATIONS

Combined Chinese Office Action and Search Report dated Sep. 18, 2016 in Chinese Patent Application No. 201480001390.2 (with English translation of category of documents).
Extended European Search Report dated Feb. 27, 2017 in European Patent Application No. 14888755.7.
Ma Guo-Zheng, "Development and Practice of PLC Intelligent Fault Diagnosis System at Tiantie Sinter Workshop", China Academic Journal Electronic Publishing House, 1994-2017, pp. 37-40 (with English abstract).
Yong Cao, et al., "Data Monitoring and Information Push of Engineering Machinery in Large Data Age", China Academic Journal Electronic Publishing House, May 2013, pp. 131-133 (with English abstract).
"Application of Integrated Automation Based on Internet of Things Technology in Coal Mine" Telecommunications Technology, Sep. 2011, pp. 96-99 (with English abstract).
Chunyan Huang, et al., "Design and Research on Intelligent Walking Aid", China Science and Technology Information, May 2013, pp. 150 and 152 (with English abstract).
Chu Hui-Ping, et al., "Design of Intelligent Vehicle Driving Management System Based on Mobile Network Technology", Information Technology, Apr. 2013, pp. 222-223 (with English abstract).
Jianbo Wang, "Discussion on Safety Management of Substation Automation System and Technology", Digital Technology and Applications, 2012, pp. 234-235 (with English abstract).
Liqiang Xiao, et al., "Research on B_S Distributed Monitoring System Based on Industrial Ethernet", Coal Science & Technology Magazine, No. 3, Jun. 30, 2011, pp. 13-15 (with English abstract).
Yongde Yang et al., "Design and maintenance of medium-wave transmitter automation system", Radio & Television Information, Jan. 2012, pp. 72-75 (with English abstract).
Yu Qiu-Rui, "Application of FCS in coal mine surface production", Electric Drive Automation, vol. 34 No. 3, Mar. 2012, pp. 55-58 (with English abstract).
"Break Down to Search Navigation System at Turn over Car Machine Auto Control System of Research and Application", China Instrumentation, Aug. 2012, pp. (60-65) (with English abstract).
Xiao-dong Chen, et al., "Design of Breakdown Self-diagnostic and Voice Alarm System about Shower Box Group", Computer Technology and Development, vol. 22 No. 8, Aug. 2012, pp. 225-228 (with English abstract).
Zhang Haiying, et al., "Design of remote intelligent monitoring system based on CAN fieldbus", www.pcachina.com, vol. 30 No. 23, 2011, pp. 98-100 (with English abstract).
Kui-yong Cui, "PLC Control Video in Coal Mine Ethernet Server Design Application", Coal Technology, vol. 31 No. 09, Sep. 2012, pp. 31-33 (with English abstract).
Xiao-zhao Wu, "The Analysis on Connected Car Technology System and the Industrial Chain", Beijing Vocational Collage of Finance and Commerce, Aug. 2012, pp. 47-52 (with English abstract).
Xiao-yan Fan, "Design of AC charging point for electronic vehicles based on embedded system", Modern Electronics Technique, vol. 35 No. 16, Aug. 2012, pp. 178-180 (with English abstract).
Rong Shaowei, Design of microphone control system based on ARM 11, Kunming Shipborne Equipment Research & Tset Centre, vol. 30 No. 11, Nov. 2011, pp. 36-39 (with English abstract).
Han Yanru, et al. "Research of Traffic Alert and Collision Avoidance System (TCAS) Risk and Countermeasure", Computer Measurement & Control, 2012, pp. 737-740 (with English abstract).
Shuaiqi Ma, et al., "Design of Locomotive Brake Lock Detection System Based on Bridge Type Sensor", Diesel Locomotive, vol. 469, Mar. 2013, pp. 43-46 (with English abstract).
"Research on digital Home Application Based on Wired Broadband Network", CATV, 2011, pp. 116-134.

* cited by examiner

FAULT DETECTION METHOD AND DEVICE

CROSS-REFERENCE TO RELATED APPLICATION

This application is a National Stage of International Application No. PCT/CN2014/074892, filed on Apr. 8, 2014, which is hereby incorporated by reference in its entirety.

TECHNICAL FIELD

The present disclosure relates to the field of communications technologies, and in particular, to a terminal-device-based fault detection method and device.

BACKGROUND

With development of communications technologies, a home box-shaped device, for example, an integrated access device (IAD) and an optical network unit (ONU), and the like has been widely used. Therefore, a digital access terminal device is exponentially-spreading and used all over the world.

However, when maintenance personnel are deploying a home box-shaped device, a case of unavailable service usually occurs, but the maintenance personnel cannot find a fault cause in a timely manner. Additionally, after the maintenance personnel deploys the home box-shaped device, in a process of using the home box-shaped device by a user, a case in which services such as voice and broadband cannot be executed may suddenly occur. In this case, the user can do nothing but send a warranty notification to the maintenance personnel of the home box-shaped device, and the maintenance personnel goes to the user's home to perform troubleshooting on the home box-shaped device, which prolongs time for troubleshooting of the home box-shaped device, and the user cannot conveniently use the device.

It can be learned that during times when massive home box-shaped devices are deployed, how to locate, in a quick and timely manner, a fault that occurs in a home box-shaped device becomes an urgent problem to be resolved.

SUMMARY

In view of this, embodiments of the present disclosure provide a fault detection method and device to resolve a problem of how to locate, in a quick and timely manner, a fault that occurs in a home box-shaped device.

According to a first aspect, a fault detection method is provided, including:

receiving, by a terminal device, a fault detection instruction entered by a user, and determining a service type of a to-be-detected fault according to the fault detection instruction;

determining, by the terminal device, fault detection content according to the service type;

starting, by the terminal device, to detect the fault detection content to obtain a detection result; and presenting, by the terminal device, the detection result.

With reference to the possible implementation manner of the first aspect of the present disclosure, in a first possible implementation manner, the receiving, by a terminal device, a fault detection instruction entered by a user includes:

receiving, by the terminal device, a touch control operation performed by the user on a preset fault detection key, and determining the fault detection instruction according to the touch control operation.

With reference to the possible implementation manner of the first aspect of the present disclosure, in a second possible implementation manner, the receiving, by a terminal device, a fault detection instruction entered by a user, and determining a service type of a to-be-detected fault according to the fault detection instruction includes:

receiving, by the terminal device, a touch control operation performed by the user on a preset fault detection start key;

presenting, by the terminal device, fault detection information after receiving the touch control operation, where the fault detection information includes one or more service types supported by the terminal device and a fault detection code used to detect a fault of the service type; and receiving, by the terminal device, the fault detection code that is of the fault of the service type and is entered by the user, and determining the service type of the to-be-detected fault according to the fault detection code.

With reference to the possible implementation manner of the first aspect of the present disclosure, or with reference to the first possible implementation manner of the first aspect of the present disclosure, or with reference to the second possible implementation manner of the first aspect of the present disclosure, in a third possible implementation manner, the presenting, by the terminal device, the detection result includes:

broadcasting, by the terminal device, the detection result in a voice broadcast manner; or displaying, by the terminal device, the detection result in a screen display manner; or sending, by the terminal device, the detection result to a preset terminal or a fault detection system.

With reference to the possible implementation manner of the first aspect of the present disclosure, or with reference to the first possible implementation manner of the first aspect of the present disclosure, or with reference to the second possible implementation manner of the first aspect of the present disclosure, or with reference to the third possible implementation manner of the first aspect of the present disclosure, in a fourth possible implementation manner, the detection result includes a fault cause of the service type or a fault response policy of the service type.

According to a second aspect, a fault detection apparatus is provided, including:

a receiving module, configured to receive a fault detection instruction entered by a user;

a service type determining module, configured to determine a service type of a to-be-detected fault according to the fault detection instruction received by the receiving module;

a fault detection content determining module, configured to determine fault detection content according to the service type determined by the service type determining module;

a fault detection module, configured to start to detect the fault detection content determined by the fault detection content determining module to obtain a detection result; and a result presentation module, configured to present the detection result obtained by the fault detection module by means of detection.

With reference to the possible implementation manner of the second aspect of the present disclosure, in a first possible implementation manner, the receiving module is specifically configured to receive a touch control operation performed by the user on a preset fault detection key; and the service type determining module is specifically configured to determine the fault detection instruction according to the touch control operation received by the receiving module.

With reference to the possible implementation manner of the second aspect of the present disclosure, in a second possible implementation manner, the apparatus further includes a service presentation module, where:

the receiving module is specifically configured to receive a touch control operation performed by the user on a preset fault detection start key;

the service presentation module is specifically configured to present fault detection information after the receiving module receives the touch control operation, where the fault detection information includes one or more service types supported by the apparatus and a fault detection code used to detect a fault of the service type;

the receiving module is further configured to receive the fault detection code that is of the fault of the service type and is entered by the user; and the service type determining module is specifically configured to determine the service type of the to-be-detected fault according to the fault detection code received by the receiving module.

With reference to the possible implementation manner of the second aspect of the present disclosure, or with reference to the first possible implementation manner of the second aspect of the present disclosure, or with reference to the second possible implementation manner of the second aspect of the present disclosure, in a third possible implementation manner, the result presentation module is specifically configured to: broadcast the detection result in a voice broadcast manner; or display the detection result in a screen display manner; or
send the detection result to a preset terminal or a fault detection system.

With reference to the possible implementation manner of the second aspect of the present disclosure, or with reference to the first possible implementation manner of the second aspect of the present disclosure, or with reference to the second possible implementation manner of the second aspect of the present disclosure, or with reference to the third possible implementation manner of the second aspect of the present disclosure, in a fourth possible implementation manner, the detection result includes a fault cause of the service type or a fault response policy of the service type.

According to a third aspect, a fault detection device is provided, including:

a receiving apparatus, configured to receive a fault detection instruction entered by a user;

a processor, configured to: determine a service type of a to-be-detected fault according to the fault detection instruction received by the receiving apparatus; determine fault detection content according to the service type; and start to detect the fault detection content to obtain a detection result; and an output apparatus, configured to present the detection result obtained by the processor by means of detection.

With reference to the possible implementation manner of the third aspect of the present disclosure, in a first possible implementation manner, the receiving apparatus is specifically configured to receive a touch control operation performed by the user on a preset fault detection key; and the processor is specifically configured to determine the fault detection instruction according to the touch control operation received by the receiving apparatus.

With reference to the possible implementation manner of the third aspect of the present disclosure, in a second possible implementation manner, the receiving apparatus is specifically configured to receive a touch control operation performed by the user on a preset fault detection start key; and the output apparatus is further configured to present fault detection information after the receiving apparatus receives the touch control operation, where the fault detection information includes one or more service types supported by the terminal device and a fault detection code used to detect a fault of the service type;

the receiving apparatus is further configured to receive the fault detection code that is of the fault of the service type and is entered by the user; and the processor is specifically configured to determine the service type of the to-be-detected fault according to the fault detection code.

With reference to the possible implementation manner of the third aspect of the present disclosure, or with reference to the first possible implementation manner of the third aspect of the present disclosure, or with reference to the second possible implementation manner of the third aspect of the present disclosure, in a third possible implementation manner, the output apparatus is specifically configured to: broadcast the detection result in a voice broadcast manner; or display the detection result in a screen display manner; or
send the detection result to a preset terminal or a fault detection system.

With reference to the possible implementation manner of the third aspect of the present disclosure, or with reference to the first possible implementation manner of the third aspect of the present disclosure, or with reference to the second possible implementation manner of the third aspect of the present disclosure, or with reference to the third possible implementation manner of the third aspect of the present disclosure, in a fourth possible implementation manner, the detection result includes a fault cause of the service type or a fault response policy of the service type.

In the embodiments of the present disclosure, a terminal device receives a fault detection instruction entered by a user, and determines a service type of a to-be-detected fault according to the fault detection instruction; determines fault detection content according to the service type; starts to detect the fault detection content to obtain a detection result; and presents the detection result. In this way, whether in a period of deploying or in a period of using the terminal device, the fault detection instruction is directly triggered when there is a need to determine whether the terminal device is faulty, and then the fault detection content corresponding to the service type of the to-be-detected fault is detected, which effectively implements a self-detection capability of the terminal device, increases a fault locating speed, and improves fault detection accuracy.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To achieve an objective of the present disclosure, embodiments of the present disclosure provide a fault detection method and device. A terminal device receives a fault detection instruction entered by a user, and determines a service type of a to-be-detected fault according to the fault detection instruction; determines fault detection content according to the service type; starts to detect the fault detection content to obtain a detection result; and presents the detection result. In this way, whether in a period of deploying or in a period of using the terminal device, the fault detection instruction is directly triggered when there is a need to determine whether the terminal device is faulty, and then the fault detection content corresponding to the service type of the to-be-detected fault is detected, which effectively implements a self-detection capability of the terminal device, increases a fault locating speed, and improves fault detection accuracy.

It should be noted that the terminal device described in the embodiments of the present disclosure may be a home box-shaped device, for example, a home gateway device.

The solution described in the embodiments of the present disclosure may be used in a period of installing or in a period of using the terminal device, which is not limited herein.

The following describes the embodiments of the present disclosure in detail with reference to accompanying drawings in this specification.

Embodiment 1

Figure 3:
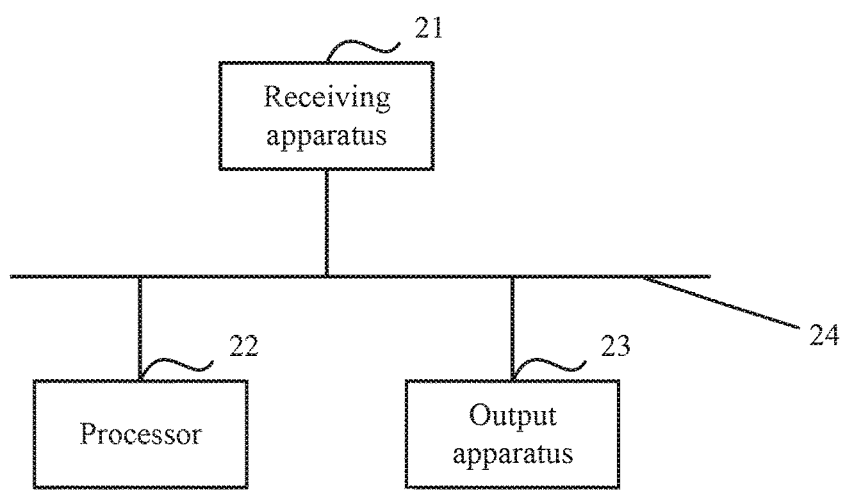
FIG. 3 is a schematic flowchart of a fault detection device according to Embodiment 3 of the present disclosure.

As shown in FIG. 3, FIG. 3 is a schematic flowchart of a fault detection method according to Embodiment 3 of the present disclosure. The method may be described as follows:

Step 101: A terminal device receives a fault detection instruction entered by a user.

In step 101, a manner in which the terminal device receives the fault detection instruction entered by the user includes but is not limited to:

receiving, by the terminal device, a key instruction entered by the user, and determining the fault detection instruction according to the key instruction.

The received key instruction entered by the user may be obtained by triggering a specified key, or may be obtained by triggering a specified combination of keys.

In a first situation:

the terminal device receives a touch control operation performed by the user on a preset fault detection key, and determines the fault detection instruction according to the touch control operation.

Specifically, different keys are disposed on the terminal device, where the keys may include a dedicated fault-detection-type key, may also include a dedicated normal-communication-type key, and may further include a dedicated auxiliary-function-type key.

The user sends different key instructions to the terminal device by touching and controlling different keys.

The key instructions include at least a fault-detection-type key instruction, a normal-communication-type key instruction, and an auxiliary-function-type key instruction.

The fault-detection-type key is used when a fault occurs, and the user may initiate a fault detection instruction by touching and controlling the fault-detection-type key.

When receiving a key instruction entered by the user, if it is determined that the key instruction is obtained by triggering the fault-detection-type key, the terminal device determines to initiate the fault detection instruction.

It should be noted that fault-detection-type keys may be classified into different fault-detection-type keys according to different service types. For example, a voice service is corresponding to a voice service fault detection key; an Internet service is corresponding to an Internet service fault detection key; an Internet protocol television (IPTV) service is corresponding to an IPTV service fault detection key; a WiFi service is corresponding to a WiFi service fault detection key; a networking service is corresponding to a networking service fault detection key.

Optionally, a fault detection start key may be further disposed on the terminal device.

The fault detection start key is used when a fault occurs, and the user may initiate a fault detection start instruction by touching and controlling the fault detection start key, so as to instruct the terminal device to enable a fault detection function.

The terminal device receives a touch control operation performed by the user on the preset fault detection start key, and presents fault detection information after receiving the touch control operation.

When receiving a key instruction entered by the user, if it is determined that the key instruction is obtained by triggering the fault detection start key, the terminal device determines to initiate the fault detection start instruction.

The fault detection information includes one or more service types supported by the terminal device and a fault detection code used to detect a fault of the service type.

There may be multiple manners of presenting the fault detection information, for example, using a voice broadcast manner to notify the user of the service type of the to-be-detected fault and the fault detection code for triggering detection of the service type of the to-be-detected fault, and using a screen display manner to notify the user of the service type of the to-be-detected fault and the fault detection code for triggering detection of the service type of the to-be-detected fault, so that the user can select one or several fault detection codes according to an indication of the terminal device.

The terminal device receives the fault detection code that is of the fault of the service type and is entered by the user.

The fault detection code may include a fault diagnosis prefix code and a service type information code. The fault diagnosis prefix code includes special keys (for example, a # key) on the terminal device, and the service type information code includes number keys or letter keys (for example, 0 to 9, or A to Z, or a to z) on the terminal device.

For example, a fault detection code corresponding to a voice service is ###01; a fault detection code corresponding to an Internet service is ###02; a fault detection code corresponding to an IPTV service is ###03; a fault detection code corresponding to a WiFi service is ###04; a fault detection code corresponding to a networking service is ###05, where "###" is a fault diagnosis prefix code.

The terminal device receives the fault detection code entered by the user, and determines, according to the fault detection code, to initiate the fault detection instruction.

Optionally, the fault detection key configured by the terminal device may also be a Reset key. In this case, the Reset key not only has a restart function in the prior art, but also has a function of starting fault detection.

When the key instruction that is entered by the user and is received by the terminal device is obtained by triggering the fault detection start key and the Reset key, the terminal device determines to initiate the fault detection instruction.

It should be noted that the keys are used to start detection of faults of various service types. When the user touches and controls the fault detection start key and the Reset key, the terminal device starts fault detection of all service types.

Step 102: The terminal device determines a service type of a to-be-detected fault according to the fault detection instruction.

In step 102, because the fault detection instruction received by the terminal device in step 101 is obtained by using different key instructions, a manner of determining the service type of the to-be-detected fault also varies according to the different key instructions.

When the fault detection instruction received by the terminal device is obtained by triggering the fault-detection-type key, a service type, of a to-be-detected fault, corresponding to the fault detection instruction obtained by triggering the fault-detection-type key is determined according to a correspondence between the fault-detection-type key and the service type.

For example, if the received fault detection instruction is obtained by triggering an Internet service fault detection key, it is determined that the service type of the to-be-detected fault is an Internet service.

If the received fault detection instruction is obtained by triggering an IPTV service fault detection key, it is determined that the service type of the to-be-detected fault is an IPTV service.

When the fault detection instruction received by the terminal device is obtained by using the received fault detection code, the service type of the to-be-detected fault is determined according to the fault detection code.

Specifically, the terminal device parses the fault detection code, determines a service type information code included in the fault detection code, and determines the service type of the to-be-detected fault according to the service type information code.

For example, when the received fault detection code is "###02", it is obtained, by means of parsing, that "###" is a fault diagnosis prefix code and "02" is a service type information code, it is determined, according to a preconfigured correspondence between a service type information code and a service type, that a service type corresponding to "02" is a voice service, and the service type of the to-be-detected fault is the voice service.

Step 103: The terminal device determines fault detection content according to the service type.

In step 103, because different service types are corresponding to different services, and the different services are corresponding to different service execution devices, it means that fault detection content also varies according to different service types. Therefore, after the service type of the to-be-detected fault is determined, the fault detection content corresponding to the service type of the to-be-detected fault is further determined.

The fault detection content includes at least one or more of a line that carries a service, an operating status of a device used to execute a service, and a data transmission capability.

For example, if it is determined that the service type of the to-be-detected fault is an Internet service, it is determined that the fault detection content corresponding to the service type of the to-be-detected fault includes a port connection status, a Ping operation execution status, data flow statistical information, a packet loss status of data flow-transmission, and the like.

If it is determined that the service type of the to-be-detected fault is a voice service, it is determined that the fault detection content corresponding to the service type of the to-be-detected fault includes information about whether a line is connected, information about whether interference exists, call quality, and the like.

Step 104: The terminal device starts to detect the fault detection content to obtain a detection result, and presents the detection result.

In step 104, after determining the fault detection content corresponding to the service type of the to-be-detected fault, the terminal device starts to detect the fault detection content, and determines the detection result corresponding to the fault detection content.

The detection result includes a fault cause of the service type or a fault response policy of the service type.

For example, the fault detection content is a line that carries a service, it is determined, by starting transmission of a detection data packet between the terminal device and a peer end at which the service occurs, that whether the line is connected, and a cause of a line fault or a response policy of a line fault is obtained.

That the terminal device presents the detection result includes:

broadcasting, by the terminal device, the detection result in a voice broadcast manner; or displaying, by the terminal device, the detection result in a screen display manner; or sending, by the terminal device, the detection result to a preset terminal or a fault detection system.

It should be noted that if the obtained detection result is that a fault exists and the user can rectify the fault by himself, a response policy for rectifying the fault is included in the detection result; if the obtained detection result is that a fault exists but the user cannot rectify the fault by himself, the detection result is sent to the user, and meanwhile, the detected fault is reported to the fault detection system.

According to the solution in Embodiment 1 of the present disclosure, a terminal device receives a fault detection instruction entered by a user, and determines a service type of a to-be-detected fault according to the fault detection instruction; determines fault detection content according to the service type; starts to detect the fault detection content to obtain a detection result; and presents the detection result. In this way, whether in a period of deploying or in a period of using the terminal device, the fault detection instruction is directly triggered when there is a need to determine whether the terminal device is faulty, and then the fault detection content corresponding to the service type of the to-be-detected fault is detected, which effectively implements a self-detection capability of the terminal device, increases a fault locating speed, and improves fault detection accuracy.

Embodiment 2

Figure 2:
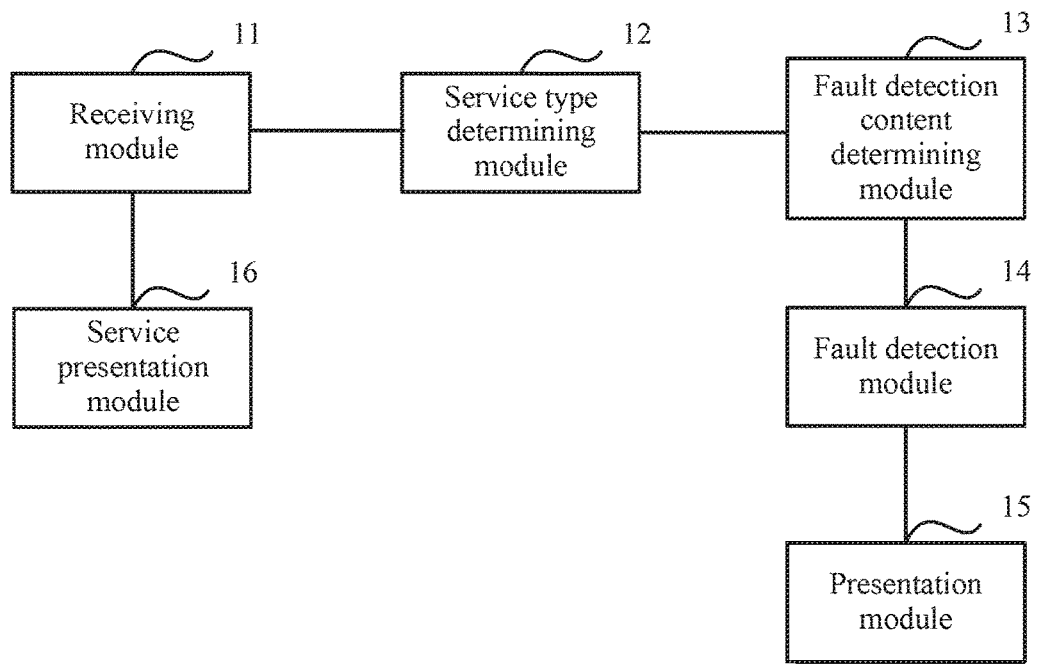
FIG. 2 is a schematic flowchart of a fault detection apparatus according to Embodiment 2 of the present disclosure.

As shown in FIG. 2, FIG. 2 is a schematic structural diagram of a fault detection apparatus according to Embodiment 2 of the present disclosure. The apparatus has a function of executing Embodiment 1 of the present disclosure. The apparatus includes a receiving module 11, a service type determining module 12, a fault detection content determining module 13, a fault detection module 14, and a presentation module 15.

The receiving module 11 is configured to receive a fault detection instruction entered by a user.

The service type determining module 12 is configured to determine a service type of a to-be-detected fault according to the fault detection instruction received by the receiving module 11.

The fault detection content determining module 13 is configured to determine fault detection content according to the service type determined by the service type determining module 12.

The fault detection module 14 is configured to start to detect the fault detection content determined by the fault detection content determining module 13 to obtain a detection result.

The result presentation module 15 is configured to present the detection result obtained by the fault detection module 14 by means of detection.

Optionally, the receiving module 11 is specifically configured to receive a touch control operation performed by the user on a preset fault detection key.

The service type determining module is specifically configured to determine the fault detection instruction according to the touch control operation received by the receiving module.

Optionally, the apparatus further includes a service presentation module 16.

The receiving module 11 is specifically configured to receive a touch control operation performed by the user on a preset fault detection start key.

The service presentation module 16 is configured to present fault detection information after the receiving module 11 receives the touch control operation, where the fault detection information includes one or more service types supported by the terminal device and a fault detection code used to detect a fault of the service type.

The receiving module 11 is further configured to receive the fault detection code that is of the fault of the service type and is entered by the user.

The service type determining module 12 is specifically configured to determine the service type of the to-be-detected fault according to the fault detection code received by the receiving module 11.

Optionally, the result presentation module 15 is specifically configured to: broadcast the detection result in a voice broadcast manner; or
display the detection result in a screen display manner; or
send the detection result to a preset terminal or a fault detection system.

The detection result includes a fault cause of the service type or a fault response policy of the service type.

It should be noted that, the apparatus described in Embodiment 2 of the present disclosure may be implemented in a hardware manner, or may be implemented in a software manner; the apparatus may be a home gateway, or may be a home box-shaped device, which is not limited herein.

Embodiment 3

As shown in FIG. 3, FIG. 3 is a schematic structural diagram of a fault detection device according to Embodiment 3 of the present disclosure. The device has a function of executing Embodiment 1 of the present disclosure. The device may use a structure of a general-purpose computer system; and the computer system may be specifically a processor-based computer. The device includes a receiving apparatus 21, a processor 22, and an output apparatus 23, where the receiving apparatus 21, the processor 22, and the output apparatus 23 are connected by using a communications bus 24.

The processor 22 may be a general-purpose central processing unit (CPU), a microprocessor, an application-specific integrated circuit (ASIC), or one or more integrated circuits that are configured to control program execution of the solutions of the present disclosure.

The communications bus 23 may include a path, over which information is transferred between the foregoing components.

The receiving apparatus 21 is configured to receive a fault detection instruction entered by a user.

The processor 22 is configured to: determine a service type of a to-be-detected fault according to the fault detection instruction received by the receiving apparatus 21; determine fault detection content according to the service type; and start to detect the fault detection content to obtain a detection result.

The output apparatus 23 is configured to present the detection result obtained by the processor 22 by means of detection.

Optionally, the receiving apparatus 21 is specifically configured to receive a touch control operation performed by the user on a preset fault detection key.

The processor 22 is specifically configured to determine the fault detection instruction according to the touch control operation received by the receiving apparatus 21.

Optionally, the receiving apparatus 21 is specifically configured to receive a touch control operation performed by the user on a preset fault detection start key.

The output apparatus 23 is further configured to present fault detection information after the receiving apparatus 21 receives the touch control operation, where the fault detection information includes one or more service types supported by the terminal device and a fault detection code used to detect a fault of the service type.

The receiving apparatus 21 is further configured to receive the fault detection code that is of the fault of the service type and is entered by the user.

The processor 22 is specifically configured to determine the service type of the to-be-detected fault according to the fault detection code received by the receiving apparatus 21.

Optionally, the output apparatus 23 is specifically configured to: broadcast the detection result in a voice broadcast manner; or
display the detection result in a screen display manner; or
send the detection result to a preset terminal or a fault detection system.

The detection result includes a fault cause of the service type or a fault response policy of the service type.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for fault detection, comprising:
receiving, by a terminal device, a touch control operation performed by a user on a preset fault detection key;
determining, by the terminal device, a fault detection instruction according to the touch control operation;
determining, by the terminal device, a service type of a to-be-detected fault according to the fault detection instruction, wherein the to-be-detected fault is a type of fault that the fault detection instruction designates for detection, and the service type of the to-be-detected fault is that of a service that is configured to process information that is of a same type as the type of the to-be-detected fault;
determining, by the terminal device, fault detection content according to the service type, wherein the fault detection content includes operational information associated with successful operation of the service that is configured to process the information that is of the same type as the type of the to-be-detected fault;
analyzing, by the terminal device, the fault detection content including the operational information to obtain a detection result; and
presenting, by the terminal device, the detection result.

2. The method according to claim 1, further comprising:
presenting, by the terminal device, fault detection information after receiving the touch control operation, wherein the fault detection information comprises one or more service types supported by the terminal device and a fault detection code used to detect a fault of the service type;
receiving, by the terminal device, the fault detection code for the fault of the service type that is entered by the user; and
determining the service type of the to-be-detected fault according to the fault detection code.

3. The method according claim 1, wherein the presenting, by the terminal device, the detection result comprises:
broadcasting, by the terminal device, the detection result in a voice broadcast manner.

4. The method according to claim 1, wherein the presenting, by the terminal device, the detection result comprises:
displaying, by the terminal device, the detection result in a screen display manner.

5. The method according to claim 1, wherein the presenting, by the terminal device, the detection result comprises:
sending, by the terminal device, the detection result to a preset terminal.

6. The method according to claim 1, wherein the detection result comprises a fault cause of the service type.

7. The method according to claim 1, wherein the detection result comprises a fault response policy of the service type.

8. The method according to claim 2, wherein the detection result comprises a fault cause of the service type.

9. The method according to claim 2, wherein the detection result comprises a fault response policy of the service type.

10. A device for fault detection, comprising:
a receiving apparatus configured to receive a touch control operation performed by a user on a preset fault detection key;
a processor configured to:
determine a fault detection instruction according to the touch control operation;
determine a service type of a to-be-detected fault according to the fault detection instruction, wherein the to-be-detected fault is a type of fault that the fault detection instruction designates for detection, and the service type of the to-be-detected fault is that of a service that is configured to process information that is of a same type as the type of the to-be-detected fault;
determine fault detection content according to the service type, wherein the fault detection content includes operational information associated with successful operation of the service that is configured to process the information that is of the same type as the type of the to-be-detected fault; and
analyze the fault detection content including the operational information to obtain a detection result; and
an output apparatus configured to present the detection result.

11. The device according to claim 10, wherein:
the output apparatus is further configured to present fault detection information after the receiving apparatus receives the touch control operation, wherein the fault detection information comprises one or more service types supported by the device and a fault detection code used to detect a fault of the service type;

the receiving apparatus is further configured to receive the fault detection code for the fault of the service type that is entered by the user; and the processor is further configured to determine the service type of the to-be-detected fault according to the fault detection code.

12. The device according to claim 10, wherein:
the output apparatus is configured to broadcast the detection result in a voice broadcast manner.

13. The device according to claim 10, wherein:
the output apparatus is configured to display the detection result in a screen display manner.

14. The device according to claim 10, wherein:
the output apparatus is configured to send the detection result to a preset terminal.

15. The device according to claim 10, wherein the detection result comprises a fault cause of the service type.

16. The device according to claim 10, wherein the detection result comprises a fault response policy of the service type.

17. The device according to claim 11, wherein the detection result comprises a fault cause of the service type.

18. The device according to claim 11, wherein the detection result comprises a fault response policy of the service type.

* * * * *

UNITED STATES PATENT AND TRADEMARK OFFICE
CERTIFICATE OF CORRECTION

PATENT NO. : 10,193,747 B2
APPLICATION NO. : 15/301274
DATED : January 29, 2019
INVENTOR(S) : Xigang Zhang Page 1 of 1

It is certified that error appears in the above-identified patent and that said Letters Patent is hereby corrected as shown below:

On the Title Page

Page 2, Column 2, Line 36, change "Kunming Shipborne Equipement Research & Tset Centre" to --Kunming Shipborne Equipement Research & Test Centre--.

In the Specification

Figure 1:
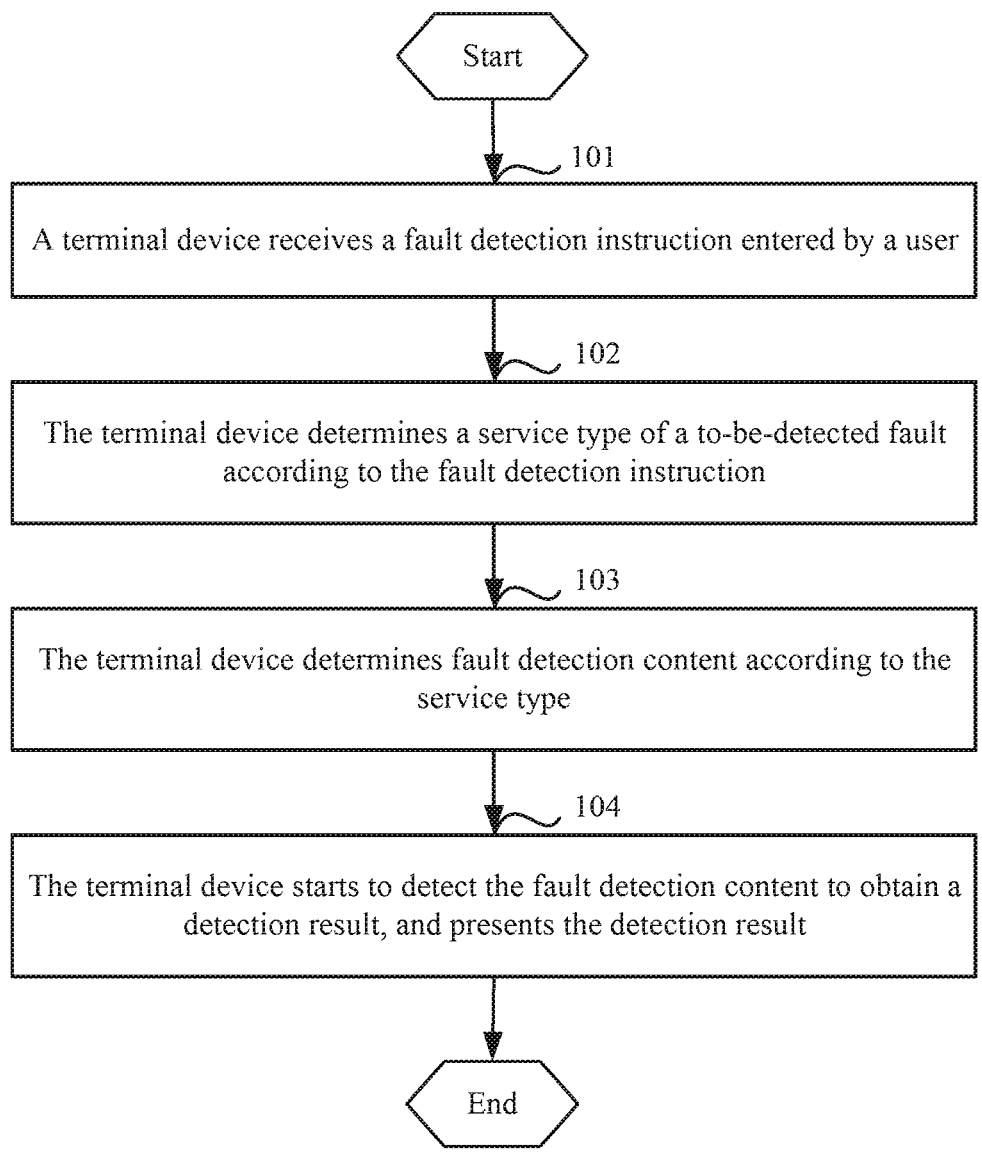
FIG. 1 is a schematic flowchart of a fault detection method according to Embodiment 1 of the present disclosure.

Column 5, Line 42, change "As shown in FIG. 3, FIG 3 is a schematic flowchart" to --As shown in FIG. 1, FIG. 1 is a schematic flowchart--;

Column 5, Line 43, change "Embodiment 3" to --Embodiment 1--.

Column 7, Line 13, change "Step 102;" to --Step 102:--.

In the Claims

Column 12, Line 19, change "3. The method according claim 1, wherein" to --3. The method according to claim 1, wherein--.

Signed and Sealed this
Eighth Day of October, 2019

Andrei Iancu
*Director of the United States Patent and Trademark Office*